United States Patent
Joe et al.

(10) Patent No.: US 6,812,935 B1
(45) Date of Patent: Nov. 2, 2004

(54) SCALING IMAGES FOR DISPLAY

(75) Inventors: Daniel R. Joe, San Jose, CA (US); Xiaoshu Qian, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,653

(22) Filed: Mar. 30, 2000

(51) Int. Cl.[7] .............................. G09G 5/00; H04N 9/74
(52) U.S. Cl. ...................... 345/660; 345/606; 345/610; 345/698; 348/581; 382/300
(58) Field of Search .................... 345/603, 605, 345/606, 607–611, 612, 613, 614–615, 619, 660, 639, 698, 643, 673, 2.1; 348/441, 445, 453, 459, 581, 771; 382/300, 274, 284, 294; 358/450, 451

(56) References Cited

U.S. PATENT DOCUMENTS

| | | | | |
|---|---|---|---|---|
| 5,202,670 A | * | 4/1993 | Oha | 358/451 |
| 5,313,567 A | * | 5/1994 | Civanlar et al. | 345/620 |
| 5,402,513 A | * | 3/1995 | Schafer | 382/298 |
| 5,570,135 A | * | 10/1996 | Gove et al. | 348/581 |
| 6,088,062 A | * | 7/2000 | Kanou et al. | 348/441 |
| 6,252,576 B1 | * | 6/2001 | Nottingham | 345/660 |
| 6,259,826 B1 | * | 7/2001 | Pollard et al. | 382/284 |
| 6,281,875 B1 | * | 8/2001 | Zhao et al. | 345/614 |
| 6,459,430 B1 | * | 10/2002 | Kusumo-Rahardjo et al. | 345/428 |

* cited by examiner

Primary Examiner—Matthew C. Bella
Assistant Examiner—Wesner Sajous
(74) Attorney, Agent, or Firm—Fish & Richardson P.C.

(57) ABSTRACT

Scaling images for display includes determining if a nearest neighbor algorithm has been selected for scaling pixels of an image and, if so, finding the nearest neighbor using a linear interpolation algorithm.

33 Claims, 3 Drawing Sheets

SCALING IMAGES FOR DISPLAY

BACKGROUND

This invention relates to scaling images for display.

Video and graphics images (source images) are often scaled down from their original resolution to fit onto display devices such as computer monitors or scaled up from their original resolution to provide an image of higher resolution and clarity. In these scaling processes, an averaging process combines (averages) two or more pixels that are spatially and/or temporally contiguous in the source image to form one destination pixel of the displayed image. The averaging process can use a nearest neighbor algorithm or a linear interpolation algorithm to effect the scaling.

Referring to FIGS. 1 and 2, the nearest neighbor algorithm computes a destination pixel (y) 10 from two pixels 12$a$–$b$ (x0, x1) in a source image as:

$$y = \begin{cases} x0 & \text{if } 0 <= p0 < 0.5 \\ x1 & \text{if } 0.5 <= p0 < 1 \end{cases}$$

For four source pixels 14$a$–$d$ (x2–x5), y 16 is:

$$y1 = \begin{cases} x2 & \text{if } 0 <= p1 < 0.5 \\ x3 & \text{if } 0.5 <= p1 < 1 \end{cases}$$

$$y2 = \begin{cases} x4 & \text{if } 0 <= p1 < 0.5 \\ x5 & \text{if } 0.5 <= p1 < 1 \end{cases}$$

$$y = \begin{cases} y1 & \text{if } 0 <= p2 < 0.5 \\ y2 & \text{if } 0.5 <= p2 < 1 \end{cases}$$

Thus, the nearest neighbor algorithm chooses the destination pixel y as the source pixel xi nearest to it.

The linear interpolation algorithm, on the other hand, computes the destination pixel 10 from two pixels 12$a$–$b$ in a source image as:

$$y = [x0*(1-p0)] + (x1*p0)$$

For four source pixels 14$a$–$d$, y 16 is:

$$y1 = [x2*(1-p1)] + (x3*p1)$$

$$y2 = [x4*(1-p1)] + (x5*p1)$$

$$y = [y1*(1-p2)] + (y2*p2)$$

Thus, the linear interpolation algorithm chooses the destination pixel y as a weighted average of the source pixels xj–xk. The destination pixel need not be one of the source pixels as it is for the nearest neighbor algorithm.

DESCRIPTION

Figure 3:
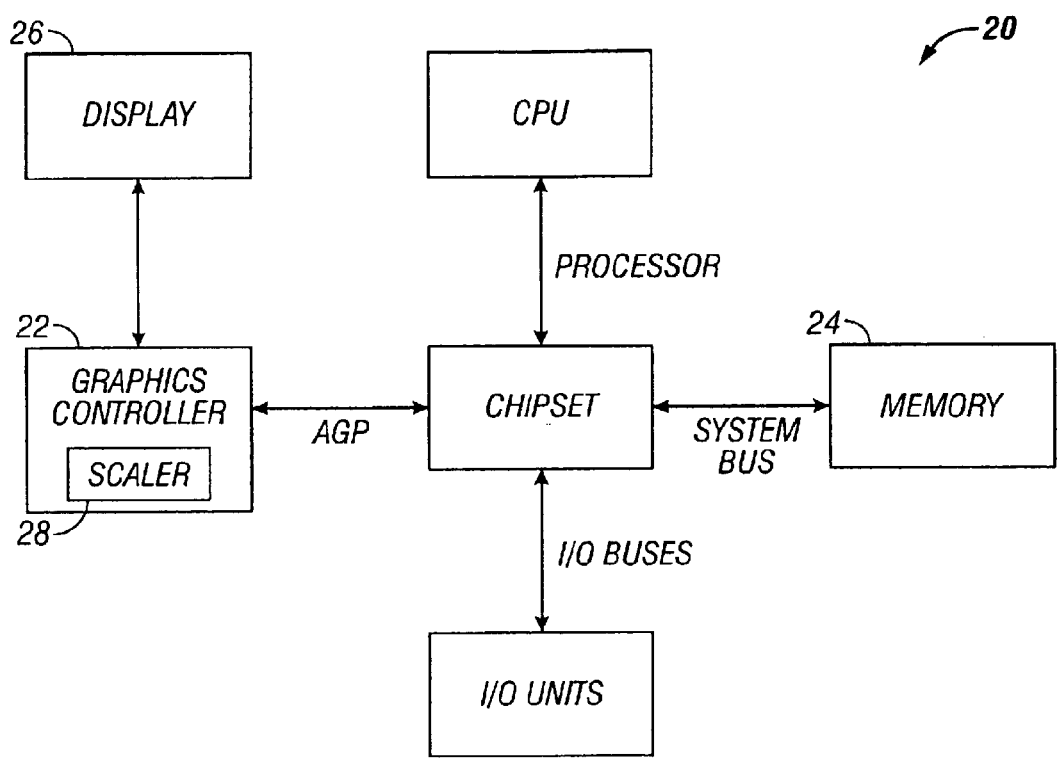
FIG. 3 is a block diagram of a computer system.

Referring to FIG. 3, in one embodiment of the invention, a system 20 includes a graphics controller 22 responsible for many of the graphics processing tasks performed on source images stored in a memory 24 before a display device 26 displays the source images. The graphics controller 22 includes a scaler 28 that scales the source images to a resolution supported by the display device 26. In scaling the source images, the scaler 28 can use a nearest neighbor algorithm or a linear interpolation algorithm depending on a current (real-time) scaling mode. The current scaling mode depends on characteristics of the source image and the system 20 including source image resolution, display resolution, refresh rate, and pixel depth. Each scaling mode supported by the scaler 28 uses one of the algorithms as indicated in two register bits included in the scaler 28, each register bit indicating one of the two algorithms. The active algorithm is indicated with a one or a zero (depending on system configuration), and the inactive algorithm is indicated with the opposite value. Software can specify which algorithm each mode corresponds to by programming the state of the register bits, or a user of the system 20 may accomplish the same result by programming (or reprogramming) the scaler 28 to use a certain algorithm for a certain mode.

Figure 4:
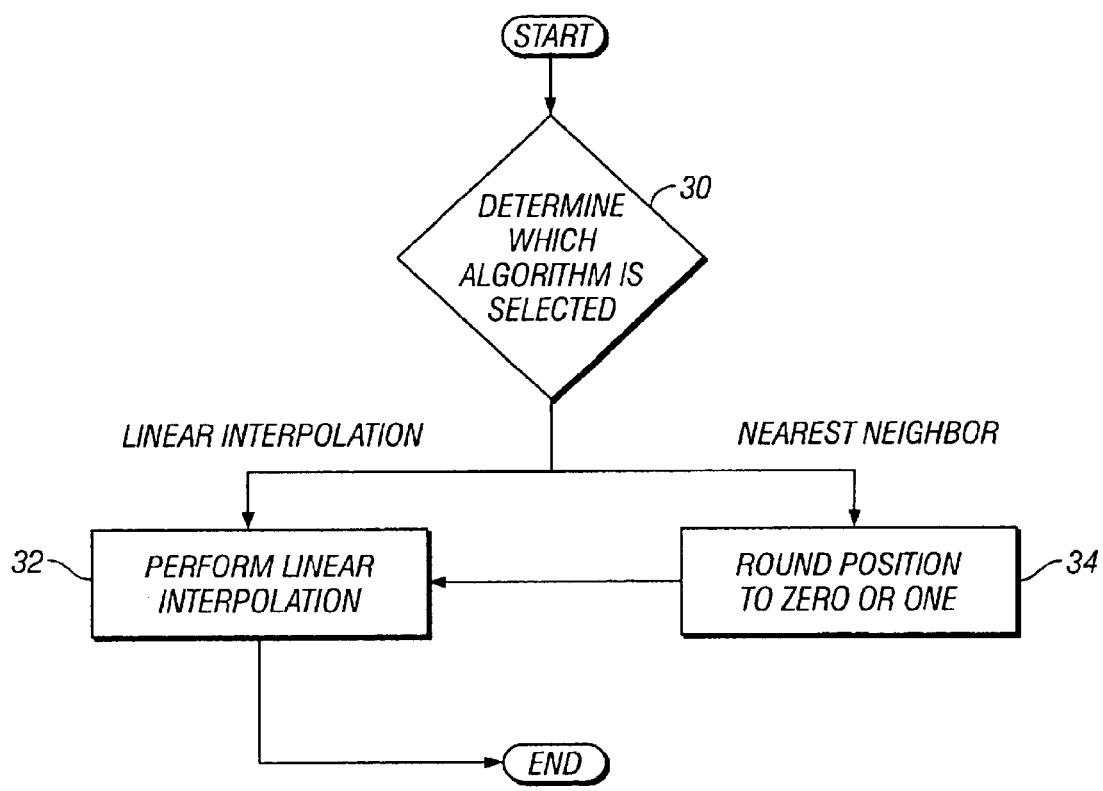
FIG. 4 is a flowchart of a scaling process in accordance with an embodiment of the invention.

Also referring to FIG. 4, the scaler 28 determines (30) which algorithm is selected for the current scaling mode by examining one or both of the register bits using software and/or hardware. If the linear interpolation algorithm is selected, the scaler 28 performs (32) linear interpolation using a hardware device as described above, although a software device may be used in addition to or as a substitute for the hardware device. If the nearest neighbor algorithm is selected, the scaler 28 also performs (32) linear interpolation, but instead of using the actual distances between the destination pixel and the source pixels (pX and (1-pX) in the equations above), the scaler 28 chooses (34) zero or one as the distance variable p(NN) as shown:

$$p(NN) = \begin{cases} 0 & \text{if } 0 <= pX < 0.5 \\ 1 & \text{if } 0.5 <= pX < 1 \end{cases}$$

Figure 1:
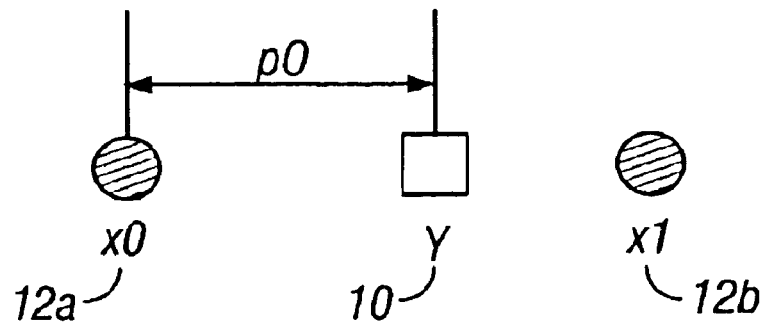
FIGS. 1 and 2 are diagrams showing pixels in a source image and in a destination image.
Figure 2:
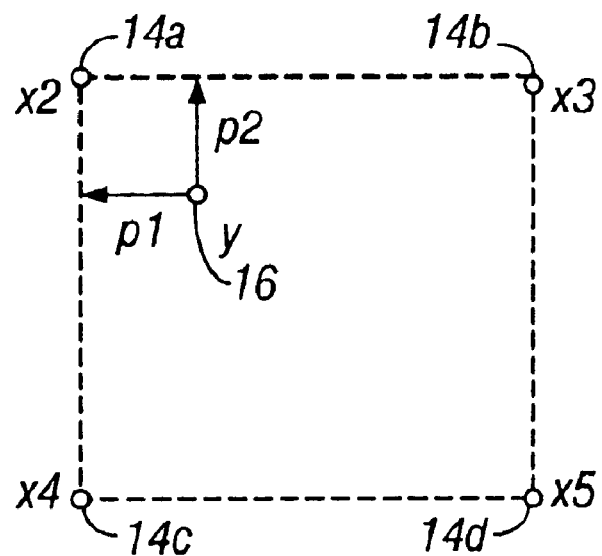

In this way, the scaler 28 in effect performs (32) a nearest neighbor calculation using the linear interpolation algorithm as shown (with reference to FIG. 1):

$$y = [x0*(1-p(NN))] + (x1*p(NN))$$

In this linear interpolation algorithm, one source pixel 12$a$–$b$ is multiplied by zero while the other is multiplied by one, effectively calculating y as the source pixel 12$a$–$b$ nearest to y. Of course, this calculation can extend to any number of source pixels. By performing (32) the linear interpolation algorithm regardless of which algorithm is selected, the scaler 28 need not include any special hardware to implement the nearest neighbor algorithm in excess of the hardware necessary to implement the linear interpolation algorithm.

Other embodiments are within the scope of the following claims.

What is claimed is:

1. A method comprising:

selecting between a nearest neighbor algorithm and a weighted average linear interpolation algorithm to reduce a source image such that at least one source pixel of the source image is not in a destination image, the selecting being based at least in part on a scaling mode associated with the source image;

if the nearest neighbor algorithm has been selected, finding one source pixel among two or more source pixels in the source image that is a nearest neighbor to a destination pixel location in the destination image by using a linear interpolation algorithm with (a) a first distance weight equal to one for the source pixel that is the nearest neighbor to the destination pixel location and (b) a second distance weight equal to zero for one or more source pixels that are not the nearest neighbor to the destination pixel location; and using the source pixel that is the nearest neighbor to the destination pixel location as a destination pixel in the destination image.

2. The method of claim 1 further comprising, if a linear interpolation algorithm has been selected for scaling pixels, using the linear interpolation algorithm to perform the scaling.

3. The method of claim 1 in which the source image is one image in a sequence of related images.

4. The method of claim 3 further comprising calculating a distance variable for the linear interpolation algorithm in the same way for each image in the sequence.

5. The method of claim 1 further comprising determining if the nearest neighbor algorithm or the linear interpolation algorithm has been selected for scaling pixels of a second original image subsequent to a first original image if a scaling mode associated with the subsequent second image differs from the scaling mode associated with the first image.

6. An article comprising a computer-readable medium which stores computer-executable instructions, the instructions causing a computer to:

select between a nearest neighbor algorithm and a weighted average linear interpolation algorithm to reduce a source image such that at least one source pixel of the source image is not in a destination image, the selecting being based at least in part on a scaling mode associated with the source image;

if the nearest neighbor algorithm has been selected, find one source pixel among two or more source pixels in the source image that is a nearest neighbor to a destination pixel location in the destination image by using a linear interpolation algorithm with (a) a first distance weight equal to one for the source pixel that is the nearest neighbor to the destination pixel location and (b) a second distance weight equal to zero for one or more source pixels that are not the nearest neighbor to the destination pixel location; and use the source pixel that is the nearest neighbor to the destination pixel location as a destination pixel in the destination image.

7. The article of claim 6, further causing a computer to, if a linear interpolation algorithm has been selected for scaling pixels, use the linear interpolation algorithm to perform the scaling.

8. The article of claim 6 in which the source image is one image in a sequence of related images.

9. The article of claim 8 further causing a computer to calculate a distance variable for the linear interpolation algorithm in the same way for each image in the sequence.

10. The article of claim 6 further causing a computer to determine if the nearest neighbor algorithm or the linear interpolation algorithm has been selected for scaling pixels of a second original image subsequent to a first original image if a scaling mode associated with the subsequent second image differs from the scaling mode associated with the first image.

11. An apparatus comprising:

a graphics device;

a software driver included in the graphics device and configured to select between a nearest neighbor algorithm and a weighted average linear interpolation algorithm to reduce a source image such that at least one source pixel of the source image is not in a destination image, the selection based at least in part on a scaling mode associated with the source image; and a mechanism included in the graphics device and configured to (a) indicate the selection in at least one register bit, (b) scale pixels in the source image using the linear interpolation algorithm, (c) if the nearest neighbor algorithm has been selected, find one source pixel among two or more source pixels in the source image that is a nearest neighbor to a destination pixel location in the destination image by using a linear interpolation algorithm with (a) a first distance weight equal to one for the source pixel that is the nearest neighbor to the destination pixel location and (b) a second distance weight equal to zero for one or more source pixels that are not the nearest neighbor to the destination pixel location, and (d) use the source pixel that is a nearest neighbor to a destination pixel location as a destination pixel in the destination image.

12. The apparatus of claim 11 in which the mechanism is also configured to, if a linear interpolation algorithm has been selected for scaling pixels, use the linear interpolation algorithm to perform the scaling.

13. The apparatus of claim 11 in which the mechanism includes the software driver.

14. The apparatus of claim 11 further comprising a register included in the mechanism and configured to indicate in one or more register bits whether the nearest neighbor algorithm has been selected.

15. The apparatus of claim 14 in which the software driver is also configured to program the one or more register bits with values depending on a scaling mode associated with the image.

16. The apparatus of claim 11 further comprising a display device configured to display the destination pixels in the destination image scaled by the mechanism.

17. The apparatus of claim 11 in which the source image is one image in a sequence of related images.

18. The apparatus of claim 17 in which the mechanism is also configured to calculate a distance variable for the linear interpolation algorithm in the same way for each image in the sequence.

19. The apparatus of claim 11 in which the software driver is also configured to determine if the nearest neighbor algorithm or the linear interpolation algorithm has been selected for scaling pixels of a second original image subsequent to a first original image if a scaling mode associated with the subsequent second image differs from the scaling mode associated with the first image.

20. A method comprising:

determining whether a nearest neighbor algorithm or a weighted average linear interpolation algorithm has been selected to reduce a source image wherein at least one source pixel of the source image is not in a destination image, the selection based at least in part on a scaling mode associated with the source image;

scaling pixels in the image using a linear interpolation algorithm if the linear interpolation algorithm has been selected; and if the nearest neighbor algorithm has been selected, using (a) a first distance weight equal to one for the source pixel that is the nearest neighbor to the destination pixel location and (b) a second distance weight equal to zero for one or more source pixels that are not the nearest neighbor to the destination pixel location.

21. The method of claim 20 in which the source image is one image in a sequence of related images.

22. The method of claim 21 further comprising calculating the a distance variable for the linear interpolation algorithm in the same way for each image in the sequence.

23. The method of claim 20 further comprising determining if the nearest neighbor or the linear interpolation algorithm has been selected for scaling pixels of a second original image subsequent to a first original image if a scaling mode associated with the subsequent second image differs from the scaling mode associated with the first image.

24. An apparatus comprising:

a graphics device configured to reduce a source image such that at least one source pixel of the source image is not in a destination image using a linear interpolation algorithm and to, if a nearest neighbor algorithm has been selected to reduce the source image, find one source pixel among two or more source pixels in the source image that is a nearest neighbor to a, destination pixel location in the destination image by using a linear interpolation algorithm with (a) a first distance weight equal to one for the source pixel that is the nearest neighbor to the destination pixel location and (b) a second distance weight equal to zero for one or more source pixels that are not the nearest neighbor to the destination pixel location; and a mechanism configured to determine a selected algorithm based at least in part on a scaling mode associated with the image, and the selected algorithm being indicated in at least one register bit included in the mechanism and to inform the graphics device of the selected algorithm.

25. The apparatus of claim 24 in which the mechanism is also configured to determine if the nearest neighbor algorithm or the linear interpolation method has been selected for scaling pixels in a second original image subsequent to a first original image if a scaling mode associated with the subsequent second image differs from the scaling mode associated with the first image.

26. The apparatus of claim 24 further comprising a hardware mechanism configured to determine a selected algorithm and to inform the graphics device of the selected algorithm.

27. The apparatus of claim 24 in which the linear interpolation algorithm is used with a distance variable equal to one or zero.

28. The apparatus of claim 24 in which the graphics device is also configured to, if a linear interpolation has been selected, use the linear interpolation algorithm to scale the pixels in the image.

29. The apparatus of claim 24 further comprising a display device configured to display the pixels in the image scaled by the graphics device.

30. The apparatus of claim 24 in which the source image is one image in a sequence of related images.

31. The apparatus of claim 30 in which the graphics device is also configured to calculate a distance variable for the linear interpolation algorithm in the same way for each image in the sequence.

32. The apparatus of claim 24 in which the mechanism includes a software driver.

33. The apparatus of claim 24 in which the mechanism includes a hardware mechanism.

* * * * *